United States Patent Office 3,335,065
Patented Aug. 8, 1967

3,335,065
FERMENTATIVE METHOD FOR THE PRODUCTION OF L-GLUTAMIC ACID
Katsunobu Tanaka, Machida-shi, Kazuo Oshima, Tokyo, and Kenichiro Takayama, Mitaka-shi, Japan, assignors to Kyowa Hakko Kogyo Co., Ltd., Chiyoda-ku, Tokyo, Japan, a corporation of Japan
No Drawing. Filed Feb. 17, 1965, Ser. No. 433,517
Claims priority, application Japan, Feb. 17, 1964, 39/8,179
7 Claims. (Cl. 195—30)

The present invention relates to the fermentative production, i.e. with the aid of microorganisms, of L-glutamic acid.

It is known that many microorganisms which, when cultured, produce L-glutamic acid from carbohydrates, may also produce L-glutamic acid from acetic acid as the sole carbon source. However, such fermentative production of L-glutamic acid by known glutamic acid-producing bacteria from acetic acid, as the raw material, is bound up with the disadvantage of low fermentation yield in comparison with the yields obtained when using carbohydrate as raw material. The fermentative conversion of acetic acid to L-glutamic acid with the aid of the said bacteria is thus of no practical significance and cannot be used on a commercial scale.

The primary object of the present invention is the embodiment of a commercial process for the fermentative production of L-glutamic acid from acetic acid, as such or in the form of its alkali metal or ammonium salt, as the raw material carbon source. Briefly stated, this object is achieved by the use of a special novel strain, namely *Corynebacterium acetoglutamicum* (KY No. 3513), which has been isolated from the soil near Tokyo, Japan, and which is also obtained from animal faces. The microorganism is a Corynebacterium, as will hereinafter be demonstrated. Its epithet (species name) is based upon its property of producing L-glutamic acid in significant quantities.

This property of producing large amounts of L-glutamic acid from acetic acid in the fermentation liquid, i.e. in the acetic acid-containing nutrient medium employed for aerobically culturing the said *Corynebacterium acetoglutamicum* (KY No. 3513) solves the problem of the fermentative production, on a commercial scale, of L-glutamic acid from the relatively inexpensive raw material, acetic acid, as the sole assimilable carbon source.

A characteristic feature of the new microorganism, on the use of which the present invention is based, is that it does not produce glutamic acid from sugars, but does produce remarkable quantities of L-glutamic acid when acetic acid is used as sole assimilable carbon source.

The aforesaid *Corynebacterium acetoglutamicum* (KY No. 3513) has the following properties.

(A) MORPHOLOGICAL CHARACTERISTICS

Shape of bacterium: usually short rods with round ends and sometimes ellipsoidal or club-shape. Occurring in single or pairs.
Size: 0.8 to 1.2 x 1.2 to 3.0μ.
Motility: non-motile.
Metachromatic granules observed: branching cells rarely recognized.
Gram positive (in an old culture, Gram negative of about 50% is recognized).

(B) CULTURAL CHARACTERISTICS (1) Agar plate: slightly weak growth, circular, smooth, slightly raised to flat, entire pale yellow, opaque, dull, slightly dry.
(2) Agar slant: moderate to scanty growth, filiform, raised to flat, dull, smooth, opaque, pale yellow, butyrous.
(3) Broth: slightly turbidic, flocculent sediment, no odor.
(4) Agar stab.: best at stop, filiform.
(5) Glucose nutrient agar: scanty or no growth.

(C) PHYSIOLOGICAL CHARACTERISTICS (1) Optimum temperature: 25°–30° C. (slight growth at 37° C.).
(2) Optimum pH: 6–8.
(3) Relation to free oxygen: aerobic to faculative anaerobic.
(4) Litmus milk: not changed.
(5) Gelatin: not liquefied.
(6) Hydrogen sulfide: not formed.
(7) Indole: not formed.
(8) Starch: not hydrolysed.
(9) Nitrate: not reduced.
(10) Catalase: positive.
(11) Urease: positive.
(12) Acetylmethylcarbinol: not formed.
(13) Methyl Red test: negative.
(14) Acid is not formed from carbohydrates.
(15) Large amounts of L-glutamic acid are produced from acetic acid.
(16) When glucose or acetic acid is used as a carbon source, $NH_4H_2PO_4$ is not utilized as sole nitrogen source in Hucker's medium.
(17) Cellulose is not decomposed.

The present bacterium was classified according to "Bergey's Manual of Determinative Bacteriology," 7th edition. This strain belongs to family Corynebacteriaceae because it is Gram positive, not spourated, aerobic and rod shape with granules. Furthermore, it is proper to classify it in genus Corynebacterium because it is Gram positive, non-motile, does not decompose cellulose and isolated from animal faces.

Points of difference in related strains are as follows:

|  | Present bacterium | Corynebacterium pseudodiph-theriticum | Corynebacterium equi |
|---|---|---|---|
| Color in nutrient agar | Pale yellow | Gray or cream | Tan to yellow or pink to red. |
| Growth in nutrient agar | Slightly weak; slightly dry. | Moist | Usually moist. |
| Optimum temperature | 25°–30° C | 37° C | 25°–37° C. |
| Growth on the addition of glucose | Inhibited |  | Stimulated. |

A culture of *Corynebacterium acetoglutamicum* (KY No. 3513) is on deposit under accession No. ATCC 15806, at American Type Culture Collection, Rockville, Md.

In the process according to the present invention, the raw materials: acetic acid, sodium acetate, potassium acetate, ammonium acetate, etc. are used as assimilable carbon source, while the assimilable inorganic or organic nitrogen sources conventionally employed in the fermentative production of glutamic by means of usual glutamic acid-producing bacteria are here also used as nitrogen source.

In carrying out the culturing according to the present invention, the nutrient medium (culture medium) containing the acetic acid or aforementioned salt thereof as sole assimilable carbon source and also containing a nitrogen source as precedingly defined as well as the usual inorganic salt, has its pH adjusted to 6.0 to 7.0, and is then sterilized. The strain employed according to the present invention, *Corynebacterium acetoglutamicum* (KY No. 3513), is then inoculated into the said culture medium and incubated at 25° to 30° C. under aerobic conditions. During the culturing period, the pH of the culture medium is advantageously adjusted to 6.8 to 7.8 by the addition thereto of aqueous solution of acetic acid and ammonium acetate. The fermentation is completed when the production of L-glutamic acid reaches its maximum usually in 2 or 3 days. The fermentation liquor is then passed through ion exchange resin, in per se known manner, whereupon the L-glutamic acid is adsorbed. The L-glutamic acid is then extracted with aqueous alkali, concentrated, and cooled. Crystals of L-glutamic acid separate, are isolated and recrystallized. The recovery or harvesting of the L-glutamic acid from the fermentation liquor is per se no part of the present invention, and may be carried out in any manner known in prior fermentative processes for the production of L-glutamic acid. (Any other known procedure for recovering L-glutamic acid from a fermentation medium in which it was produced, can also be employed.)

The following illustrative but non-limitative examples of presently preferred embodiments of the invention further explain the present invention. The invention extends no only to the use of the aforesaid microorganism [*Corynebacterium acetoglutamicum* (KY No. 3513)] but also to mutant strains thereof with the characteristic of the said bacterium, and produced e.g. by mutation under the action of ultra-violet rays, X-rays, etc.

*Example 1*

A culture medium consisting of

| | Grams |
|---|---|
| Sodium acetate | 500 |
| Ammonium sulfate | 200 |
| Meat extract | 20 |
| Calcium carbonate | 300 |
| $KH_2PO_4$ | 10 |
| $MgSO_4 \cdot 7H_2O$ | 2 |
| Urea | 30 | and
Water, ad. 10 liters.

is adjusted to pH 7.0 with sodium hydroxide solution. *Corynebacterium acetoglutamicum* (KY No. 3513) (ATCC No. 15806) is inoculated in the thus-obtained fermentation medium, and aerobic shaking culture is carried out at 30° C. 15 grams of L-glutamic acid per liter is accumulated in 72-hour culture. 10 liters of the fermentation liquor thus obtained is passed, in per se known manner, through cation exchange resin whereby the L-glutamic acid is adsorbed thereon. The adsorbed L-glutamic acid is then eluted from the resin with dilute aqueous ammonia. Crystallization of the L-glutamic acid from the effluent containing the same in solution, in conventional manner, yields 120 grams of L-glutamic acid.

*Example 2*

*Corynebacterium acetoglutamicum* (KY No. 3513) (ATCC No. 15806) is inoculated into a culture medium containing, per 3 liters,

| | Grams |
|---|---|
| Sodium acetate | 60 |
| Ammonium sulfate | 30 |
| $KH_2PO_4$ | 1.5 |
| $K_2HPO_4$ | 1.5 |
| $MgSO_4 \cdot 7H_2O$ | 1.5 |
| $FeSO_4 \cdot 7H_2O$ | 0.6 |
| $MnSO_4 \cdot 4H_2O$ | 0.060 |
| Meat extract | 6 |
| Peptone | 6 | the remainder being water, and the medium being adjusted to pH 6.0 to 7.0. Aerobic shaking culture is carried out at 27° to 30° C. 8 grams of L-glutamic acid per liter is accumulated in 40-hour culture.

Purification after the manner described in Example 1 yields 19.8 grams of purified crystals of L-glutamic acid.

*Example 3*

*Corynebacterium acetoglutamicum* (KY No. 3513) (ATCC No. 15806) is inoculated into a culture medium consisting of

| | Grams |
|---|---|
| Sodium acetate | 200 |
| Peptone | 100 |
| Meat extract | 50 |
| Yeast extract | 50 |
| Sodium chloride | 25 | and
Water, ad. 10 liters.

at pH 6.5 to 7.5. Incubation is carried out at 30° C. for 24 hours with shaking under aerobic conditions.

Thereafter, 10 milliliters of the thus-obtained 54-hour culture is inoculated into an aqueous fermentation medium containing, per 10 liters of medium,

| | | |
|---|---|---|
| Sodium acetate | kilograms | 2 |
| Ammonium sulfate | do | 1 |
| $KH_2PO_4$ | grams | 50 |
| $K_2HPO_4$ | do | 50 |
| $MgSO_4 \cdot 7H_2O$ | do | 50 |
| $FeSO_4 \cdot 7H_2O$ | do | 20 |
| $MnSO_4 \cdot 4H_2O$ | do | 2 | the remainder being water. Incubation is then carried out at 30° C. with shaking under aerobic conditions. During this cultivation, there is gradually added an aqueous solution containing 4 parts of acetic acid and 1 part of ammonium acetate, the pH of the fermentation liquor being thus maintained at pH 6.8 to 7.8. 50 grams of L-glutamic acid per liter are thus accumulated in 48-hour culture. The fermentation yield is thus equivalent to 45% by weight relative to the weight of acetic acid employed.

Purification after the manner set forth in Example 1 yields 4.0 kilograms of L-glutamic acid.

Where purification of the L-glutamic acid produced according to the present fermentation process is carried out with cation exchange resin, use may be made e.g. of a commercially available resin cation exchange material of the acid regenerated type. Such exchange resins are obtained by condensing aldehydes such as formaldehyde with phenols or with phenol-sulfonic acids, etc. A sulfonated polystyrene type cation exchange resin may also be used; these are commercially available under the name of Amberlite.

What is claimed is:

1. In a process for producing L-glutamic acid by cultivating an L-glutamic acid-producing microorganism in a nutrient medium containing acetic acid as sole assimilable carbon source, and no $NH_4H_2PO_4$, until L-glutamic acid has accumulated and recovering the so-accumulated L-glutamic acid, the improvement according to which the microorganism is *Corynebacterium acetoglutamicum* (ATCC No. 15806), whereby enhanced amounts of L-glutamic acid are produced.

2. In a process for producing L-glutamic acid by cultivating an L-glutamic acid-producing microorganism in a nutrient medium containing acetic acid as sole assimilable carbon source, and no $NH_4H_2PO_4$, until L-glutamic acid has accumulated and recovering the so-accumulated L-glutamic acid, the improvement according to which the microorganism is a mutant of *Corynebacterium acetoglutamicum* (ATCC No. 15806), whereby enhanced amounts of L-glutamic acid are produced.

3. In a process for producing L-glutamic acid by cultivating an L-glutamic acid-producing microoganism in a nutrient medium containing a member selected from the group consisting of alkali metal acetate and ammonium acetate as sole assimiliable carbon source, and no $NH_4H_2PO_4$, until L-glutamic acid has accumulated and recovering the so-accumulated L-glutamic acid, the improvement according to which the microorganisms is *Corynebacterium acetoglutamicum* (ATCC No. 15806), whereby enhanced amounts of L-glutamic acid are produced.

4. A method of producing L-glutamic acid which comprises cultivating under aerobic conditions *Corynebacterium acetoglutamicum* (ATCC No. 15806) in an aqueous nutrient medium containing a source of assimilable nitrogen, no $NH_4H_2PO_4$ and, as sole source of assimilable carbon, acetic acid until maximal production of L-glutamic acid has been achieved, and recovering such L-glutamic acid from the fermentation broth.

5. A method of producing L-glutamic acid which comprises cultivating under aerobic conditions *Corynebacterium acetoglutamicum* (ATCC No. 15806) in an aqueous nutrient medium containing a source of assimilable nitrogen, no $NH_4H_2PO_4$ and, as sole source of assimilable carbon, a member selected from the group consisting of alkali metal acetate and ammonium acetate until maximal production of L-glutamic acid has been achieved, and recovering such L-glutamic acid from the fermentation broth.

6. In a process for producing L-glutamic acid by cultivating an L-glutamic acid producing microorganism in a nutrient medium containing acetic acid as sole assimilable carbon source, until L-glutamic acid has accumulated, and recovering the so-accumulated L-glutamic acid, the improvement according to which the microorganism is *Corynebacterium acetoglutamicum* (ATCC No. 15806), whereby enhanced amounts of L-glutamic acid are produced.

7. A method of producing L-glutamic acid which comprises cultivating under aerobic conditions *Corynebacterium acetoglutamicum* (ATCC No. 15806) in an aqueous nutrient medium containing as sole source of assimilable carbon, a member selected from the group consisting of acetic acid, alkali metal acetate, and ammonium acetate, until L-glutamic acid has accumulated, and recovering such L-glutamic acid from the fermentation broth.

References Cited

UNITED STATES PATENTS 3,117,915   1/1964   Shiio et al. ---------- 195—30

A. LOUIS MONACELL, *Primary Examiner.*

L. M. SHAPIRO, *Assistant Examiner.*